United States Patent [19]

Hallstrom et al.

[11] 3,954,694

[45] *May 4, 1976

[54] WEARING COMPOSITION

[75] Inventors: James R. Hallstrom, Brookfield; Raymond J. Hoffman, Fox Point; Ronald L. Walling, Sussex, all of Wis.

[73] Assignee: Rexnord, Inc., Milwaukee, Wis.

[ * ] Notice: The portion of the term of this patent subsequent to Apr. 8, 1992, has been disclaimed.

[22] Filed: Feb. 3, 1975

[21] Appl. No.: 546,686

[52] U.S. Cl............................................. 260/37 EP
[51] Int. Cl.²......................................... C08G 51/04
[58] Field of Search ................................ 260/37 EP

[56] References Cited
UNITED STATES PATENTS 3,876,579    4/1975    Hallstrom et al. .............. 260/37 EP

OTHER PUBLICATIONS

S. Sterman & J. Marsden, "Silone Coupling Agents," Ind. & Eng. Chem., Vol. 58, No. 3 (Mar. 1966 pp. 33–37).

*Primary Examiner*—Donald E. Czaja
*Assistant Examiner*—S. M. Person
*Attorney, Agent, or Firm*—Kinzer, Plyer, Dorn & McEachran

[57] ABSTRACT

This is concerned with the coating or composition for use as a coating to be applied to surfaces subjected to wear to increase the life of the surface by resisting excessive wear thereon where the surface is subjected to a high abrasion or an abrasive atmosphere. The coating is intended to be trowelable, meaning that it can be applied with a trowel or any similar tool or instrumentality which enables it to be applied at the site or on the job.

9 Claims, 2 Drawing Figures

WEARING COMPOSITION

SUMMARY OF THE INVENTION

This invention is concerned with a coating or composition that can be applied on the job to a surface that is otherwise subjected to wear due to external forces. The wear may be of a sliding, cutting or gouging or an impact abrasive nature and the coating or surface to be applied thereto exhibits superior abrasion resistance.

A primary object of the invention is a coating of the above type which is of a composition that uses less expensive ingredients.

Another object is a coating of the above type which has abrasion-resistant characteristics at least equal to prior compositions but is less expensive to make.

Another object is a wearing compound which has excellent shelf life and reduced tendency to settle out.

Another object is a composition of the above type having large and small abrasion-resistant particles contained or embedded in a matrix with the small particles rather randomly dispersed among the larger particles with improved bonding or adhesion between the particles and the matrix.

Another object is a coating of the above type which has a reasonably long working life.

Another object is an abrasive-resistant coating or composition of the above type that is at least as resistant to wear as Ni-Hard iron.

Another object is an abrasive-resistant coating or composition having a resistance to wear approaching that of ceramic tile.

Another object is an abrasion-resistant coating of the above type in which the ceramic media used may be varied in size, surface texture and chemical composition.

Another object is a unitary system that provides a wearing composition which includes two containers with an uncured resin in one, a curing agent in the other, and both large and small abrasion-resistant particles in each.

Another object is a unitary system of the above type in which each container includes a small amount of a silane coupling agent.

Another object is a unitary system of the above type in which different coupling agents are used in each container.

Other objects will appear from time to time in the ensuing specification, claims, and drawings.

DESCRIPTION OF THE PREFERRED EMBODIMENT

The invention is concerned with a coating or composition which may be applied to a surface on machinery or other wearing surfaces so as to improve their wear-resistant capabilities. The composition includes a matrix or binder with particles therein including both large and small particles in which the larger particles may be referred to as "large abrasion-resistant particles" and the smaller as "coabrasive filler particles" which are much smaller and preferably of a hardness on the order of the hardness of the material causing the wear. The composition is included or supplied in two containers which make up a unitary system. One of the container is filled with a certain amount of an uncured resin and also includes the large abrasion-resistant particles in it and also the much smaller coabrasion resistant filler particles. The second container has a proportional amount of a curing agent and also includes both the large and small particles, so that the contents of both containers are capable of being readily mixed together. Preferably, the volume or contents of the two containers are related in an easy ratio, for example 2 to 1, with the volume of the uncured resin container being twice that of the curing agent container so that their contents can be mixed, either totally or partially, on a 2 to 1 basis, without the necessity of accurate measurements.

When the contents are mixed, the mixture will have a pasty consistency and a working time of, say, 30 minutes, so that a man in the field may thoroughly mix it and then trowel it onto the surface that needs increased wear resistance. For example, the composition may be used to gain high wear on return idlers, feed chutes and boxes, rod and ball mills, pump casings, feed plates, conveyor skirts, dust collectors and cyclones, box outlets, laundry chutes, slurry line elbows, chute linings, drag line pulleys, feed chutes, pipe elbows, pan feeders, buckets, hoppers, classifier flights and shoes, water circulators, etc.

One of the objects of the present invention is to avoid having to use a special bead or special large abrasion-resistant particle which has been specially treated so that it will effectively bond with the matrix. Such beads can be expensive and it is desirable to effect a good bond between the particles, both large and small, without having to resort to an expensive bead.

Figure 1:
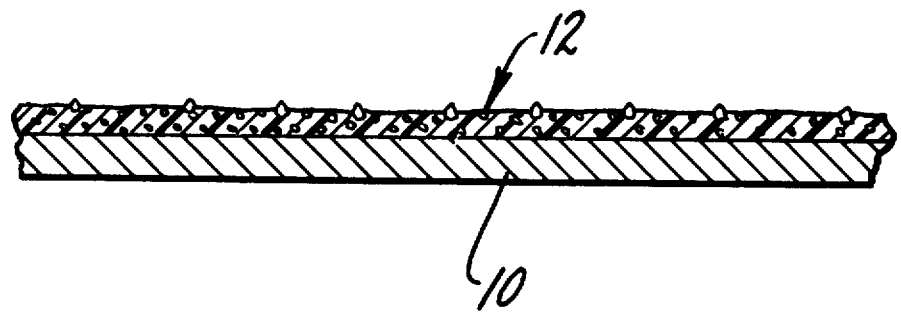
FIG. 1 is a side view, in section, through a typical application in a diagrammatic or schematic representation.
Figure 2:
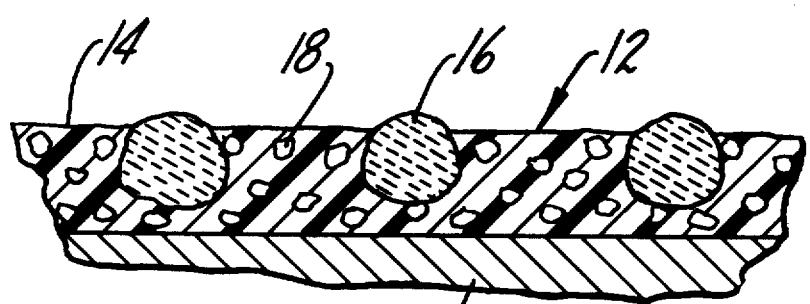
FIG. 2 is a portion of FIG. 1 on a enlarged scale.

A composition according to the invention may take a number of different forms and is schematically shown in the drawings in which a base or substrate 10 has been illustrated which may be assumed to be a worn part or a part subject to abrasion, such as a bucket, hopper, or what-have-you. A coating or composition 12 is superimposed on the surface thereof and, as shown in FIG. 2, in a somewhat schematic or diagrammatic manner, the coating includes a matrix or base substance or bonding agent 14 containing and holding in place large abrasive-resistant particles 16 at suitable intervals with smaller abrasive filler particles 18 in the matrix and interposed in random fashion between, around, and among the larger particles or chips. In addition, the matrix bonds fully and firmly to the underlayer or base 10 and may be a polymer, such a polyester (unsaturated), a urethane, synthetic and natural rubbers, epoxies, polyimides, etc. The matrix holds the larger abrasive-resistant particle 16 in position thereto and in relation to each other and also holds the coabrasive filler particles 18 in a random dispersion throughout the matrix and in position to take the wear. The matrix itself, which may include the resin and a thixotropic agent, when mixed and adhering to the surface, acts as a cushion for the large abrasive-resistant particles. During impact of the material causing wear, which might be sand, gravel, ores, etc., energy is transmitted through the particles to the matrix and is then dissipated. This prevents cracking and breaking of the more brittle large abrasive-resistant particles.

In such a composition, the coabrasive or secondary filler particles 18 are of a much smaller size than the primary abrasive-resistant particles 16 and these smaller particles are interposed in the voids or interstices between the larger particles. The coabrasive filler 18 protects the matrix 14 from being worn away from between the abrasive-resistant particles and, in effect, prevents the matrix in the intermediate area from being undermined. As a result, the abrasive-resistant large particles remain in place in the matrix longer and provide a longer wearing surface. The abrasive-resistant particles and coabrasive fillers are maintained in suspension in the polymer matrix during mixing and curing operations by means of a thixotropic agent.

It is desired to use a ceramic bead which is not specially coated, for example with a metal, to obtain a good bond between the matrix and the particles and this has been done by the use of a silane coupling agent, the purpose being to improve the bond between the matrix or resin and the bead itself. This is most advantageously accomplished by using an epoxy terminated silane in the resin mix and an amine terminated silane in the hardener or accelerator mix. When the two components are then intermixed, some from each container, the resin can react with the amine terminated ceramic bead and vice versa. In short, everything reacts. One bead can react with the other coupling agent, so to speak. Also, the coupling agent gives increased bonding between the matrix and the coabrasive filler, as well as between the matrix and the substrate or surface subject to wear. And the concentration of coupling agents is so low that price is not adversely affected.

While many polymer, abrasive-resistant particles, coabrasive fillers and thixotropic agents, along with various coupling agents, may be found suitable, a more specific and particularly desirable composition is obtained by the use of high alumina ceramic beads as the abrasive-resistant particles. More specifically, these may be ceramic beads from the Ferro Corporation, otherwise known as "Ferro Beads" or Coors porcelain known as "Coors Beads." The particles may be on the order of a fraction of an inch, for example on the order of one-sixteenth inch in their largest dimension.

A coabrasive filler found to function particularly well in a wearing composition applied in accordance with this invention may be silicon carbide, for example on the order of 180 mesh size. However, other fillers may be used as long as they are about as hard as the material being handled or causing the wear, in other words the material that is impinging upon the surface that it is desired to protect. By way of example, but not a limitation, the following substances may be used as both the primary large and the secondary small abrasion-resistant particles. For example, diamond dust, Boron carbide, Boron nitride, tungsten carbide, alumina ceramic, silica sand, taconite, etc. And it is desired that the coabrasive filler have a hardness on the order of the hardness of material causing wear. For example, where sand is the abrasive material causing wear, silica sand or silica flour may advantageously be used as the coabrasive filler.

Where the invention is in the form of a unitary system in two containers, it is desirable to provide the large abrasive-resistant particles and the coabrasive filler particles in both containers, both in the resin container and the curing agent container. The object of this is so that a mixing ratio between the resin and curing agent of approximately 2 to 1 may be acquired, whether the components are measured by weight or volume. Also, it provides thorough wetting of all of the abrasion-resistant particles and coabrasive fillers. A thorough wetting of these materials may be difficult to obtain if the materials are provided in only one of the two components.

A specific example of a suitable composition for use in the invention is:

EXAMPLE I

| Resin Component | Parts by Weight |
|---|---|
| Dow DER 331, Dow Chemical Co. | 50.0 |
| Asbestos, "RG-144", Union Carbide Corp. | 3.0 |
| $TiO_2$, "Titanox", National Lead Co. | 1.0 |
| Silicon Carbide, 180X Simonds Abrasive Division, The Wallace Murray Corp. | 23.3 |
| Ferro Beads, Ferro Corporation | 130.0 |
| Dow 6040 Epoxy Silane, Dow Chemical Co. | 0.5 |
| | 207.8 |

| Curing Component | Parts by Weight |
|---|---|
| Jefferson AL-1, Jefferson Chemical Co. | 10.0 |
| Vanamid 50-40, R.T. Vanderbilt Company | 10.0 |
| Asbestos, "RG-144", Union Carbide Corp. | 2.0 |
| Silicon Carbide, 180X Simonds Abrasive Div., The Wallace Murray Corp. | 21.7 |
| Ferro Beads, Ferro Corporation | 70.0 |
| Dow 6020 Amine Silane, Dow Chemical Co. | 0.3 |
| | 114.0 |

In this example the resin may be supplied in one can and a curing agent in another, the two being sold together with the resin can being, for example, a one gallon container and the curing components being in a one-half gallon container. This is merely an example and it should be understood that any suitable sizes could be used depending upon the needs of the customer and the amount of material to be used in application. But the above has been found to be convenient. In this situation, a proportion of the amounts would be emptied from each, for example 2 to 1, and thoroughly mixed before application to the surface to be protected. If all is not used at once, the two cans may be sealed up and used later.

Another example of a suitable composition is as follows:

EXAMPLE II

| Resin Component | Parts by Weight |
|---|---|
| Dow DER 331, Dow Chemical Co. | 50.0 |
| Asbestos, "RG-144", Union Carbide Corp. | 3.0 |
| $TiO_2$, "Titanox", National Lead Co. | 1.0 |
| Silicon Carbide, 180X Simonds Abrasive Div., The Wallace Murray Corp. | 23.3 |
| Ferro Beads, Ferro Corporation | 130.0 |
| Dow 6040 Epoxy Silane, Dow Chemical Co. | 0.5 |
| | 207.8 |

| Curing Component | Parts by Weight |
|---|---|
| Jefferson AL-1, Jefferson Chemical Co. | 10.0 |
| Vanamid 50-40, R.T. Vanderbilt Co. | 10.0 |
| Asbestos, "RG-144", Union Carbide Corp. | 2.0 |
| Silicon Carbide, 180X Simonds Abrasive Div., The Wallace Murray Corp. | 21.7 |
| Ferro Beads, Ferro Corporation | 70.0 |
| Dow 6050 Amine Silane, Dow Chemical Co. | 0.3 |
| | 114.0 |

In the above examples, when mixed, applied and cured, the following characteristics, approximately, are obtained:

| Tensile Strength | 5045 |
|---|---|
| (Cured 1 hour at 200° F.) | ±274 psi |
| Compressive Strength | 17,720 |

-continued

| | |
|---|---|
| (Cured 1 hour at 200° F.) Heat Deflection Temp. | ±352 psi 80° C. |
| (Cured 1 hour at 200° F.) Flexural Strength | 176° F. 8910 |
| (Cured 1 hour at 200° F.) Abrasion Resistance (Rotation thru Al₂O₃ (chips) (Percent weight loss after 180 hours) | ±236 psi 1.61 |

Another example of a suitable composition is as follows:

EXAMPLE III

| Resin Component | Parts by Weight |
|---|---|
| Dow DER 330, Dow Chemical Co. | 50.0 |
| Asbestos, "RG-144", Union Carbide Corp. | 3.0 |
| TiO₂, "Titanox", National Lead Co. | 1.0 |
| Silicon Carbide, 180X Simonds Abrasive Div., The Wallace Murray Corp. | 23.3 |
| Ferro Beads, Ferro Corporation | 130.0 |
| Dow 6040 Epoxy Silane, Dow Chemical Co. | 0.5 |
| | 207.8 |

| Curing Component | Parts by Weight |
|---|---|
| Jefferson AL-1, Jefferson Chemical Co. | 10.0 |
| Vanamid 50-40, R.T. Vanderbilt Co. | 10.0 |
| Asbestos, "RC-144", Union Carbide Corp. | 2.0 |
| Silicon Carbide, 180X Simonds Abrasive Div., The Wallace Murray Corp. | 21.7 |
| Ferro Beads, Ferro Corporation | 70.0 |
| Dow 6020 Amine Silane, Dow Chemical Co. | 0.3 |
| | 114.0 |

Another example of a suitable composition is as follows:

EXAMPLE IV

| Resin Component | Parts by Weight |
|---|---|
| Dow DER 331, Dow Chemical Co. | 50.0 |
| Asbestos, "RG-144", Union Carbide Corp. | 3.0 |
| TiO₂, "Titanox", National Lead Co. | 1.0 |
| Silicon Carbide, 180X Simonds Abrasive Div., The Wallace Murray Corp. | 23.3 |
| Ferro Beads, Ferro Corporation | 130.0 |
| Dow 6040 Epoxy Silane, Dow Chemical Co. | 0.5 |
| | 207.8 |

| Curing Component | Parts by Weight |
|---|---|
| Jefferson AL-1, Jefferson Chemical Co. | 10.0 |
| Versamid 140, General Mills | 10.0 |
| Asbestos "RG-144", Union Carbide Corp. | 2.0 |
| Silicon Carbide, 180X Simonds Abrasive Div., The Wallace Murray Corp. | 21.7 |
| Ferro Beads, Ferro Corporation | 70.0 |
| Dow 6020 Amine Silane, Dow Chemical Co. | 0.3 |
| | 114.0 |

In the above examples it will be noted that the large particles and coabrasive filler are in a ratio of on the order of 4 to 1, by weight, while the particles (both large particles and coabrasive filler) and matrix (resin, curing agent, coupling agent, etc.) are in a ratio on the order of 3 to 1 by weight.

In the drawings the large particles have been shown as generally round or spherical. But, in certain situations, chips might be used, particularly since the particles themselves do not have to be tumbled to receive a metal coating. However, round particles may be more desirable where the mix has to be troweled. But chips might be used in nontrowelable compositions. For example, if the composition is to be applied or cast, chips might not be objectionable and they might be less expensive.

The examples given above as to time and temperature are merely for purposes of description. The curing time is flexible and can be varied by modifying the formula somewhat to fit or suit any particular application. The same is true of curing temperatures.

Having the silane coupling agent in each can, and a different type, has the advantage that cross-reactions will be obtained when some of the contents from each can is intermixed with the other can. The present formulations also have the advantage that the large particles do not have to be specially treated beads and therefore are much less expensive. But, at the same time, the bonding effected between the particles and the matrix has been substantially upgraded.

In each of the examples given above it has been found particularly effective to first mix the particles, both large and small with their silane coupling agents so the surfaces of the beads or particles are completely and thoroughly coated with the coupling agent before the beads are then mixed with either the resin or curing agent, as the case may be, along with the other components.

In addition to giving a firm bonding between the ceramic beads and the polymer backbone, an effective coupling is also obtained between the secondary or coabrasive fillers and the matrix which hasn't been previously done in such an effective way. The result is a system of substantial physical criticality of the ceramic media can be opened up, meaning it can be varied in size, surface texture and chemical composition and is not confined to quite narrow and therefore somewhat expensive parameters.

It has been found that compounds made in accordance with the present invention are eight times more abrasive resistant than Ni-Hard iron and, in fact, approach that of ceramic tile. This means that the composition may be used in combination with ceramic tile and possibly eliminates the need for costly custom shapes. The compound is chemically resistant to water, solvents, most acids, and basic materials. It may also be used and will act as a corrosion inhibiting coating to arrest rust.

While a preferred form and several variations have been set forth above, it should be understood that suitable additional modifications, changes, alterations and substitutions may be made without departing from the invention's fundamental theme.

The embodiments of the invention in which an exclusive property or privilege is claimed are defined as follows:

1. A trowelable wearing composition for on-the-job application to a surface to provide a wearing surface having resistance to wear caused by impact, abrasion, erosion or corrosion, including a matrix composed of an uncured, curable, crosslinkable thermosetting resin, a curing agent for the resin and a thixotropic agent, large abrasion resistant ceramic particles, smaller coabrasion resistant filler particles and of a hardness on the order of that of the material causing the wear dispersed in rather random fashion among the large particles when applied, and a minor amount of a silane coupling agent to bond the matrix and the particles.

2. The composition of claim 1 further characterized in that the large ceramic particles are essentially spherical beads.

3. The composition of claim 1 further characterized in that the coabrasion resistant filler is silicon carbide.

4. The composition of claim 1 further characterized in that the thermosetting resin is an epoxy resin.

5. A curable resin composition for on-the-job application to a surface to provide a wearing surface having resistance to wear, a unitary system including a container of a certain amount of the uncured resin with large abrasion resistant ceramic particles and much smaller coabrasion resistant filler particles therethrough and of a hardness on the order of that of the material causing the wear, a separate container with a proportionate amount of a curing agent and with large abrasion resistant ceramic particles and much smaller coabrasion resistant filler particles therethrough whereby the contents of both containers are capable of mixing readily by the existence of large and much smaller abrasive particles in each container, and a minor amount of a silane coupling agent in each container to bond the matrix and the particles.

6. The composition of claim 5 further characterized in that the large ceramic particles are spherical beads.

7. The composition of claim 5 further characterized in that the smaller coabrasion resistant filler particles are silicon carbide.

8. The composition of claim 5 further characterized in that the resin is an epoxy resin.

9. The composition of claim 5 further characterized in that the resin container includes an epoxy terminated silane and the curing agent container includes an amine terminated silane.

* * * * *